(12) United States Patent
Lee et al.

(10) Patent No.: US 11,405,497 B2
(45) Date of Patent: *Aug. 2, 2022

(54) METHOD FOR PROVIDING HUMAN NETWORK MANAGEMENT SERVICE IN MOBILE TERMINAL

(71) Applicant: Samsung Electronics Co., Ltd., Gyeonggi-do (KR)

(72) Inventors: Hye-Soo Lee, Seoul (KR); Ji-Young Kim, Gyeonggi-do (KR); Seong-Hoon Kang, Gyeonggi-do (KR); Sun-Haeng Jo, Gyeonggi-do (KR)

(73) Assignee: Samsung Electronics Co., Ltd

( * ) Notice: Subject to any disclaimer, the term of this patent is extended or adjusted under 35 U.S.C. 154(b) by 44 days.

This patent is subject to a terminal disclaimer.

(21) Appl. No.: 16/884,433

(22) Filed: May 27, 2020

(65) Prior Publication Data

US 2020/0288006 A1    Sep. 10, 2020

Related U.S. Application Data

(63) Continuation of application No. 12/753,414, filed on Apr. 2, 2010, now Pat. No. 10,681,196.

(30) Foreign Application Priority Data

Apr. 2, 2009   (KR) .................. 10-2009-0028574

(51) Int. Cl.
*G06F 3/0481*        (2022.01)
*H04M 1/2745*        (2020.01)
(Continued)

(52) U.S. Cl.
CPC ........ *H04M 1/2745* (2013.01); *G06F 3/0481* (2013.01); *G06Q 30/02* (2013.01); *H04M 1/72427* (2021.01)

(58) Field of Classification Search
CPC ............ H04M 1/2745; H04M 1/72544; G06F 3/0481; G06F 3/04817; G06F 3/0482; G06F 3/0484; G06F 3/04842; G06Q 30/02

See application file for complete search history.

(56) References Cited

U.S. PATENT DOCUMENTS 5,929,853 A    7/1999 Guha
6,317,739 B1   11/2001 Hirata
(Continued)

FOREIGN PATENT DOCUMENTS

JP    2006-164086        6/2006
JP    2007081618    *   3/2007
(Continued)

OTHER PUBLICATIONS

English translation pp. 1-13 of the specification for JP2007081618 retrieved on Oct. 1, 2020 from Global Dossier (Year: 2007).*

(Continued)

*Primary Examiner* — Matthew Ell
*Assistant Examiner* — William Wong
(74) *Attorney, Agent, or Firm* — The Farrell Law Firm, P.C.

(57) ABSTRACT

A method and device are provided for providing human network information. Information associated with user contacts is received from at least one external server. A first schema of the information associated with user contacts is converted into a specific schema. Relationship information related to a first user is generated based on the information associated with the user contacts converted into the specific schema. The relationship information related to the first user includes data related to the first user and data related to a relationship between the first user and other users.

18 Claims, 6 Drawing Sheets

(51) Int. Cl.
  *G06Q 30/02* (2012.01)
  *H04M 1/72427* (2021.01)

(56) References Cited

U.S. PATENT DOCUMENTS

| | | | |
|---|---|---|---|
| 7,478,102 B2 | 1/2009 | Ellis | |
| 7,526,573 B2 | 4/2009 | Busey | |
| 7,702,685 B2 * | 4/2010 | Shrufi | G06F 16/2448 707/760 |
| 7,962,505 B2 | 6/2011 | Torrens et al. | |
| 8,140,566 B2 | 3/2012 | Boerries et al. | |
| 8,898,141 B1 * | 11/2014 | Forman | G06Q 30/0201 707/713 |
| 2001/0044800 A1 | 11/2001 | Han | |
| 2002/0032696 A1 | 3/2002 | Takiguchi | |
| 2002/0145623 A1 | 10/2002 | Decombe | |
| 2003/0036914 A1 | 2/2003 | Fitzpatrick | |
| 2004/0017376 A1 | 1/2004 | Tagliabue | |
| 2004/0083217 A1 | 4/2004 | Brackett et al. | |
| 2004/0119755 A1 | 6/2004 | Guibourge | |
| 2004/0123277 A1 | 6/2004 | Schrader et al. | |
| 2004/0128296 A1 | 7/2004 | Krishnamurthy | |
| 2004/0128322 A1 | 7/2004 | Nagy | |
| 2004/0181540 A1 | 9/2004 | Jung | |
| 2005/0055639 A1 | 3/2005 | Fogg | |
| 2005/0149537 A1 | 7/2005 | Balin et al. | |
| 2005/0172001 A1 | 8/2005 | Zaner | |
| 2005/0182741 A1 | 8/2005 | Grossman | |
| 2005/0246314 A1 | 11/2005 | Eder | |
| 2006/0048064 A1 * | 3/2006 | Vronay | G06F 9/451 715/764 |
| 2006/0052095 A1 | 3/2006 | Vazvan | |
| 2006/0167909 A1 | 7/2006 | Mendis et al. | |
| 2006/0212831 A1 * | 9/2006 | Fogg | G06Q 10/10 715/835 |
| 2006/0253787 A1 | 11/2006 | Fogg | |
| 2006/0271566 A1 * | 11/2006 | Mathias | G06F 16/258 |
| 2006/0277224 A1 | 12/2006 | Aftab | |
| 2007/0174304 A1 | 7/2007 | Shrufi et al. | |
| 2007/0255807 A1 | 11/2007 | Hayashi et al. | |
| 2008/0030496 A1 | 2/2008 | Lee | |
| 2008/0040308 A1 | 2/2008 | Ranganathan | |
| 2008/0120178 A1 | 5/2008 | Martinez et al. | |
| 2008/0134052 A1 | 6/2008 | Davis | |
| 2008/0147633 A1 * | 6/2008 | Chandley | G06F 16/9535 |
| 2008/0182563 A1 | 7/2008 | Wugofski et al. | |
| 2008/0249863 A1 | 10/2008 | Redmond | |
| 2008/0250322 A1 | 10/2008 | Szeto | |
| 2008/0255977 A1 | 10/2008 | Altberg | |
| 2008/0276164 A1 | 11/2008 | Bamford | |
| 2009/0075738 A1 | 3/2009 | Pearce | |
| 2009/0082038 A1 | 3/2009 | McKiou et al. | |
| 2009/0088254 A1 | 4/2009 | Courage et al. | |
| 2009/0157513 A1 | 6/2009 | Bonev | |
| 2009/0164624 A1 | 6/2009 | Metcalf et al. | |
| 2009/0259657 A1 | 10/2009 | Baltus | |
| 2009/0265242 A1 * | 10/2009 | Horvitz | G06Q 30/0277 726/26 |
| 2009/0276723 A1 * | 11/2009 | Narayanan | G06F 40/166 715/769 |
| 2009/0300139 A1 | 12/2009 | Shoemaker | |
| 2010/0058196 A1 | 3/2010 | Krishnan | |
| 2010/0087230 A1 | 4/2010 | Peh et al. | |
| 2010/0100952 A1 | 4/2010 | Sample et al. | |
| 2010/0106684 A1 | 4/2010 | Pizzo | |
| 2010/0162167 A1 | 6/2010 | Stallings | |
| 2010/0162171 A1 | 6/2010 | Felt | |
| 2010/0205211 A1 | 8/2010 | Ghosh | |
| 2010/0245262 A1 | 9/2010 | Vance | |
| 2010/0274815 A1 | 10/2010 | Vanasco | |

FOREIGN PATENT DOCUMENTS

| | | |
|---|---|---|
| KR | 1020020097395 | 12/2002 |
| KR | 100619858 | 9/2006 |
| KR | 100698756 | 3/2007 |
| KR | 100785331 | 12/2007 |
| KR | 1020080032548 | 4/2008 |
| WO | WO 2006/107143 | 10/2006 |
| WO | WO 2007/140411 | 12/2007 |
| WO | WO 2008/079167 | 7/2008 |

OTHER PUBLICATIONS

European Search Report dated Apr. 21, 2017 issued in counterpart application No. 10759060.6-1972, 7 pages.

* cited by examiner

| MEANING | FOAF EXPRESSION | F8 | Open Social |
|---|---|---|---|
| FULL NAME | <foaf:name> | name | name |
| LAST NAME | <foaf:surname> | Last_name | DIVIDED FROM NAME WITH SEPARATE |
| FIRST NAME | <foaf:firstName> | First_name | |
| SEX | <foaf:gender> | sex | gender |
| PHOTOGRAPH (URL) | <foaf:image> | pic_small<br>pic_big<br>pic_square<br>pic | photos |
| DATE OF BIRTH | <foaf:birthday> | birthday | birthday |
| E-MAIL | <foaf:mbox> | email_hashes | email |
| HOMEPAGE | <foaf:homepage> | profile_url | urls |
| OFFICE HOMEPAGE | <foaf:workplaceHomepage><br><foaf:schoolhomepage> | workplaceList/workplace<br>SchoolList/School | urls |
| LOCATION | <foaf:based_near> | hometown_location | currentlocation |
| CELL PHONE NUMBER | <foaf:phone> | – | phoneNumbers |
| MATTER OF INTEREST | <foaf:interest> | Interests | tags<br>interests<br>jobinterests |
| ORGANIZATION | <foaf:organization> | Affiliations | organizations |
| OTHER SITE ID | <foaf:OnlineAccount> | significant_other_id | accounts |
| INSTANT MESSENGER ID | <foaf:OnlineChatAccount> | significant_other_id | ims |
| ACQUAINTANCE LIST | <foaf:knows> | Friendlist(table) | friends |
| RELATIONSHIP EXPRESSION | Relationship module | – | relationships |

FIG.2

```
<rdf:RDF
    xmlns:rdf="http://www.w3.org/1999/02/22-rdf-syntax-ns#"
    xmlns:rdfs="http://www.w3.org/2000/01/rdf-schema#"
    xmlns:foaf="http://xmlns.com/foaf/0.1/">
  <foaf:Person>
<foaf:name>kim Min sun</foaf:name>
<foaf:title>Mrs</foaf:title>
<foaf:firstName>kim</foaf:firstName>
<foaf:surname>Min sun</foaf:surname>
<foaf:nick>sunny</foaf:nick>
<foaf:mbox>sunnyKim@gmail.com</foaf:mbox>
<foaf:homepage rdf:resource="http://sunny.net"/>
<foaf:depiction rdf:resource="http://sunny.net/profile"/>
<foaf:phone rdf:resource="tel:+82-2-1234-1235"/>
<foaf:workplaceHomepage rdf:resource="http://www.samsung.co.kr"/>
<foaf:schoolHomepage rdf:resource="http://snu.seoul.ac.kr"/>
<foaf:topic_interest> . . . </foaf:topic_interest>
<foaf:interest > . . . </foaf:interest>
<foaf:knows> . . .</foaf:knows>
  . . . .

</foaf:Person>
</rdf:RDF>
```

FIG.3

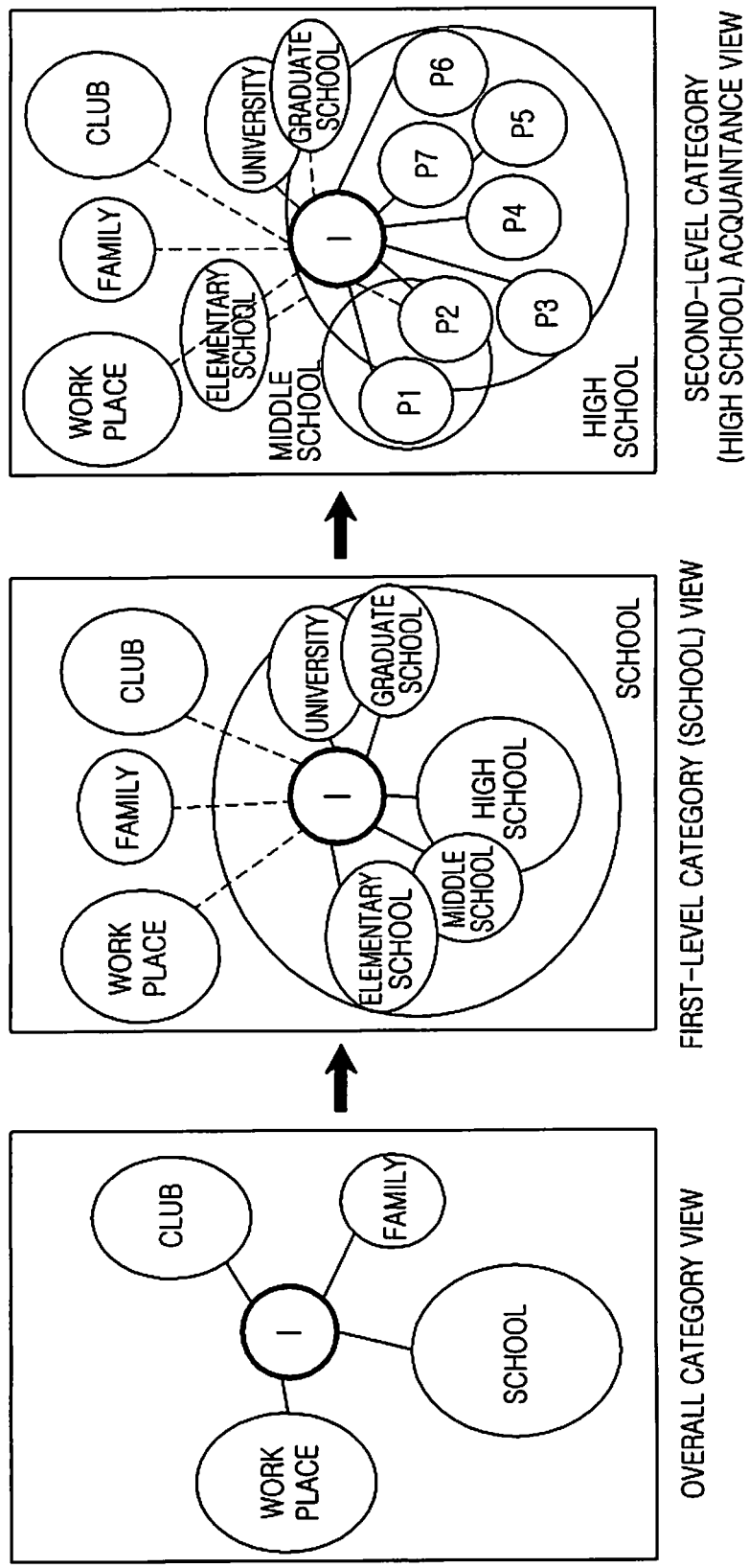

METHOD FOR PROVIDING HUMAN NETWORK MANAGEMENT SERVICE IN MOBILE TERMINAL

PRIORITY

This application is a Continuation Application of U.S. application Ser. No. 12/753,414, filed in the U.S. Patent and Trademark Office on Apr. 2, 2010, which claims priority under 35 U.S.C. § 119(a) to a Korean Patent Application filed in the Korean Intellectual Property Office on Apr. 2, 2009 and assigned Serial No. 10-2009-0028574, the entire content of which is incorporated herein by reference.

BACKGROUND OF THE INVENTION

1. Field of the Invention

The present invention relates generally to a human network management service, and more specifically to a method for defining common elements between phonebook data of a mobile terminal and human network data of various social network sites on the Internet, and linking human network data provided on the Internet with the mobile terminal, thereby providing a social network service, which has previously been 20 provided only on the Internet, in the mobile terminal.

2. Description of the Related Art

A social network represents a network that horizontally broadens from oneself on the basis of identities of individual people in the Internet. The network adds people 25 who have similar interests to an individual, thereby distinguishing a social network from general communities. Since a person having social relationships with other people may be affected by human networks and estimations of personal value, social networks have emphasized relationships with other people. Since social networks emphasizing these social relationships are highly useful for establishing personal identities and for human 30 networking, social networks are rapidly growing.

Social networks includes, for example, MYSPACE®, FACEBOOK®, HI5®, ORKUT®, LINKEDIN®, FRIENDSTER®, BEBO®, and CYWORLD®, which are sites currently providing computer-based social network services. Other new sites providing new services are continuously being created. Since users may have preferences for particular sites used by many of their friends or sites that provide more convenient services, the user often navigates between multiple sites providing the social network. However, when the user migrates from a first social networking site A to a second social networking site B, the user must again input information on himself/herself and information (i.e. social network information) about acquaintances who form a connection with the user at site A, which wastes time and is troublesome to the user.

Meanwhile, a phone book (i.e., a telephone directory) of a mobile terminal, which a user maintains without regard to time and place, stores basic information, including cell phone numbers, home telephone numbers, birthdays, e-mail addresses, group information, etc., of people who have become acquainted with the user through various aspects of the user's life, e.g., work, school, family, etc. The phone book can store information about many acquaintances who have various depths of connections with the user, from casual acquaintances to people having more significant relationships with the user, such as very close friends, etc. However, the phone book of the mobile terminal is limited to expressing a relation between the user and each acquaintance only with "group" information, and phone book data is currently only used within the mobile terminal as information for calls, texts, etc.

Conventional human network management technology can assign only one main group and one subgroup when appointing a relationship between the user and a counterpart, thereby having a disadvantage in that it is impossible to express relationships used with various human networks. In addition, conventional human network management technology does not provide a method for extending data about acquaintances registered in a social network site in cooperation with phone book data in a mobile terminal, and also does not provide a method for expressing the phone book data through various elements, such as acquaintance data expressed on a social networking web site.

SUMMARY OF THE INVENTION

Accordingly, an aspect of the present invention is to solve at least the above-mentioned problems occurring in the prior art, and to provide at least the advantages described below.

In accordance with one aspect of the present invention, a method is provided for providing human network information in an electronic device. Information associated with user contacts is received from at least one external server. A first schema of the information associated with user contacts is converted into a specific schema. Relationship information related to a first user is generated based on the information associated with the user contacts converted into the specific schema. The relationship information related to the first user includes data related to the first user and data related to a relationship between the first user and other users.

In accordance with another aspect of the present invention, an electronic device is provided for providing human network information. The electronic device includes a processor configured to receive information associated with user contacts from at least one external server, and convert a first schema of the information associated with user contacts into a specific schema. The processor is also configured to generate relationship information related to a first user based on the information associated with the user contacts converted into the specific schema. The relationship information related to the first user includes data related to the first user and data related to a relationship between the first user and other users.

BRIEF DESCRIPTION OF THE DRAWINGS

The above and other aspects, features and advantages of certain embodiments of the present invention will be more apparent from the following description taken in conjunction with the accompanying drawings, in which:

FIG. 2 is a table illustrating a mapping of human network data acquired from various social network sites according to an embodiment of the present invention;

FIG. 3 is a diagram illustrating examples of Friend Of A Friend meta data according to an embodiment of the present invention;

FIGS. 4A to 4C and 5A to 5B are diagrams illustrating display screens including human network data expressed in various forms according to embodiments of the present invention.

Throughout the drawings, the same drawing reference numerals will be understood to refer to the same elements, features and structures.

DETAILED DESCRIPTION OF EMBODIMENTS

The following description with reference to the accompanying drawings is provided to assist in a comprehensive understanding of certain embodiments of the invention as defined by the claims and their equivalents. The following description includes various specific details to assist in that understanding but these are to be regarded as mere examples. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

Figure 1:
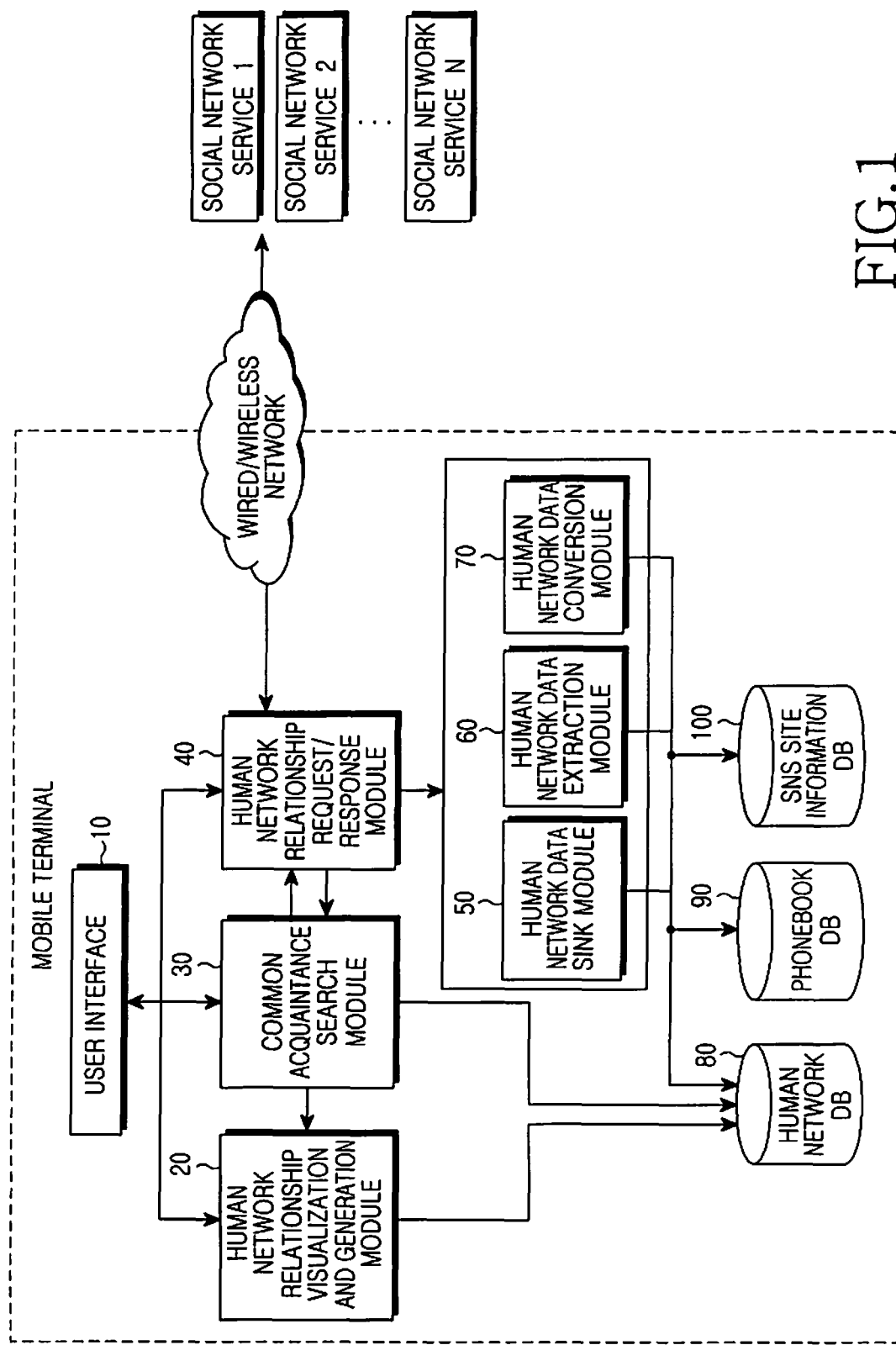
FIG. 1 is a block diagram schematically illustrating a configuration of a mobile terminal that provides a human network management service according to an embodiment of the present invention.

FIG. 1 is a block diagram schematically illustrating a configuration of a mobile terminal that provides a human network management service according to an embodiment of the present invention.

FIG. 1 illustrates a configuration of a mobile terminal that can communicate with social network service sites through a wired/wireless network. According to an embodiment of the present invention, the mobile terminal includes a user interface unit 10, a human network relationship visualization and generation module 20, a common acquaintance search module 30, a human network relationship request/response module 40, a human network data sink module 50, a human network data extraction module 60, a human network data conversion module 70, a human network database 80, a phone book database 90, and a Social Network Site (SNS) information database 100.

The user interface unit 10 receives, from the user, a request for a human network data view, a request for sharing human network with another person in order to extend human network, and a request for extending and moving human network data to a social network service on a website, and then displays a response to each request.

According to an embodiment of the present invention, the human network relationship visualization and generation module 20 groups human network relationships in various elements and forms, and displays the human network relationships in two dimensions (2D) or three dimensions (3D).

When the common acquaintance search module 30 receives a human network extension request from the user, the common acquaintance search module 30 acquires human network data of a counterpart who is to share human network data with the user, finds a common acquaintance based on the human network data of the user and the human network data of the counterpart, and transfers information on the common acquaintance to the human network relationship visualization and generation module 20. In this case, "common acquaintance" refers to an acquaintance of both the user and the counterpart, according to the human network data of the user and the counterpart, respectively.

The human network relationship request/response module 40 accesses a social network service of a web site through a mobile internet standard, such as the Wireless Fidelity (WI-FI®), the Wireless Broadband Internet (WIBRO®), the Mobile Broadband Wireless Access (MBWA), etc., by referring to the SNS information database 100 in response to a request from the user, and then acquires the human network data of the user and the human network data of a counterpart who forms a sharing connection with the user.

The human network data sink module 50 periodically acquires human network data from a site providing a social network service, which is in use by the user, and updates the human network database 80 storing human network data and the phone book database 90 storing phone book data.

The human network data extraction module 60 parses the acquired human network data, and extracts basic information of the user, information about relationships with acquaintances, etc.

When acquiring human network data from the social network service site, the human network data conversion module 70 reconstructs the acquired human network data, by means of the basic information of the user and the information on relationships with the acquaintances, which have been extracted by the human network data extraction module 60. The human network data conversion module 70 also reconstructs human network data by converting, (i.e. extending or reducing) phone book data or human network data stored in the mobile terminal into elements provided by each social network site based on information of each respective social network site, i.e. the human network data from the social network service site.

The human network database 80 stores human network data of the user. According to an embodiment of the present invention, the human network database 80 may be shared with another user according to a sharing configuration.

The phone book database 90 stores phone book data, and includes various information relating to means for contacting acquaintances.

The SNS information database 100 stores Uniform Resource Locator (URL) information, and Identification (ID) and PassWord (PW) information for authentication, which relate to a SNS site visited by the user of the mobile terminal.

At least one data portability working group is developing a standard data portability specification for mobility of individual information of a computer-based social network site, which will enable individual information to be easily moved amongst computer-based (i.e., Internet-based) social network services. However, since it is difficult to provide a standard specification for mobility, development has been progressing slowly. Therefore, the present invention proposes a method for supporting various social network sites without requiring a standard specification for mobility, which is be described below with reference to FIGS. 2 and 3.

FIG. 2 is a table illustrating a mapping of human network data acquired from various social network sites according to an embodiment of the present invention.

Referring to FIGS. 1 and 2, the human network data conversion module 70 according to an embodiment of the present invention maps a human-network-data-related schema (e.g. a data format, a data table, etc.) of each social network service site to a schema of Friend Of A Friend (FOAF). As shown in FIG. 2, the human network data conversion module 70 according to an embodiment of the present invention identifies a schema of FACEBOOK's® "F8" and/or GOOGLE's® OPENSOCIAL® platform, and maps (or converts) the identified schema to (or into) a schema form of FOAF. Through such a mapping, it is possible to secure compatibility between social network service sites although schemata defining human network data are different depending on the social network service sites.

FOAF refers to human relations where a new friend is made through a direct or indirect relationship with another pre-existing friend FOAF is a Resource Description Framework (RDF)-based meta data, and is a representative technology for describing information about the user and expressing relationships between users to extend relationships amongst the users. FOAF can be used to express the user, a group to which the user belongs, a relationship between the user and a group, etc.

Social networking sites of FACEBOOK® and GOOGLE® may be considered as representative examples of social network sites on the Internet in the United States of America, wherein FACEBOOK® provides "F8" as a social platform, and Google provides open platform "OPENSOCIAL®" as an open standard model. Many social network service companies, including MYSPACE®, TWITTER®, EBAY®, etc., participate as a member company in the OPENSOCIAL® schema.

FIG. 3 is a diagram illustrating examples of FOAF meta data according to an embodiment of the present invention.

FIG. 3 illustrates FOAF meta data containing description information about a friend named "Minsun Kim". The description information about Minsun Kim includes her name, nick name, etc.

FIGS. 4A to 4C and 5A to 5B are diagrams illustrating display screens human network data expressed in various forms according to embodiments of the present invention.

A display unit of a device has a limited size, such as in a mobile terminal, the amount of information that can be displayed through the device is limited. According to an embodiment of the present invention, human network data is stepped and displayed according to categories in order to effectively display the human network data, even when a display screen has a limited size.

As shown in FIG. 4A, a work place category, a club category, a family category, a school category, etc. are displayed as overall categories associated with the human network of the user. When the school category, for example, is selected from among the categories, an elementary school category, a middle school category, a high school category, a university category, and a graduate school category, which belong to the school category, are displayed as first-level categories, as shown in FIG. 4B. When the high school category is selected from among the first-level categories, acquaintance items belonging to the high school category are displayed as second-level categories P1 through P7, as shown in FIG. 4C.

Some of the acquaintances of the user may simultaneously belong to different categories. Therefore, according to an embodiment of the present invention, when an acquaintance belongs at least two categories, the categories of the acquaintance are overlapped and displayed as shown in FIGS. 4B and 4C. For example, the elementary school category, the middle school category, and the high school category may be partially-overlapped and displayed as shown in FIG. 4B, and/or acquaintance items corresponding to "Namjung Lee (P1)" and "Inho Song (P2)" may be expressed as items which belong to both the middle school category and high school category, as shown in FIG. 4C. "Jiyeon Lee (P3)", "Sungchan Lee (P4)", "Minjung Lee (P5)", "Chanwoo Yun (P6)," and "Minjung Kim (P7)" may be expressed as items that belong only to the high school category, as shown in FIG. 4C.

According to an embodiment of the present invention, the categories are displayed in different sizes according to the respective number of acquaintances belonging to each category, so that the user can easily determine the number of acquaintances belonging to each category. For example, the work place category, the club category, the family category, the school category, which correspond to the overall categories, may be displayed in different sizes, as shown in FIG. 4A, and the elementary school category, the middle school category, the high school category, the university category, and the graduate school category, which correspond to the first-level categories, may be displayed in different sizes, as shown in FIG. 4B.

Figure 5A:
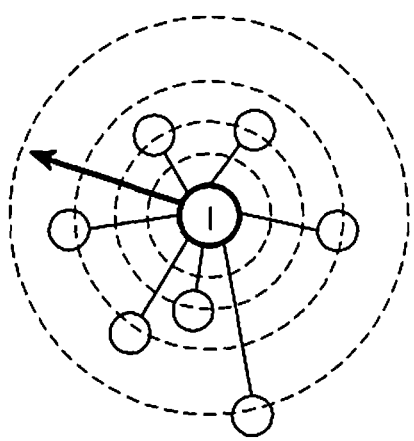

Also, according to another embodiment of the present invention, the elementary school category, the middle school category, the high school category, the university category, and the graduate school category may be displayed at different distances from a user item located at the center in order of time (e.g., year of graduation), which is shown in FIG. 5A.

Figure 5B:
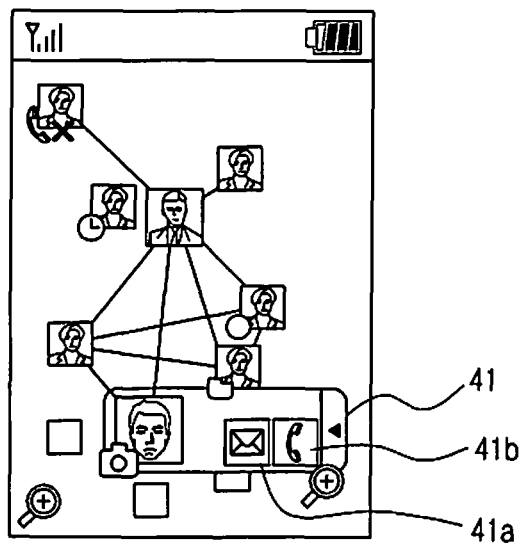

According to a still another embodiment of the present invention, a degree of friendship between the user and each acquaintance included in human network data may be expressed as distances, as shown in FIG. 5B. In this case, the degree of friendship may be classified into the classes of acquaintances who frequently contact with the user, acquaintances who occasionally contact the user, and acquaintances that rarely contact the user. The degree of friendship classification may be performed with reference to phone book data (e.g., transmission/reception histories), etc. Each acquaintance may be expressed by an image (e.g., a photograph), a character, etc, and may be expressed together with an executable function (e.g., a call function and a text sending function). For example, as shown in FIG. 5B, a separate execution window 41 may be provided, wherein an icon as indicated by a reference number 41a is provided so as to execute a text message function, and an icon as indicated by a reference number 41b is provided so as to execute a call originating function. In addition, when information sharing with a corresponding acquaintance is allowed, regardless of whether chatting is currently available, a state of emotion, a newly updated blog, information on a counterpart's schedule, a text received from the counterpart, a missed-call history, current location information, etc. may be expressed by means of the separate execution window 41.

Figure 6:
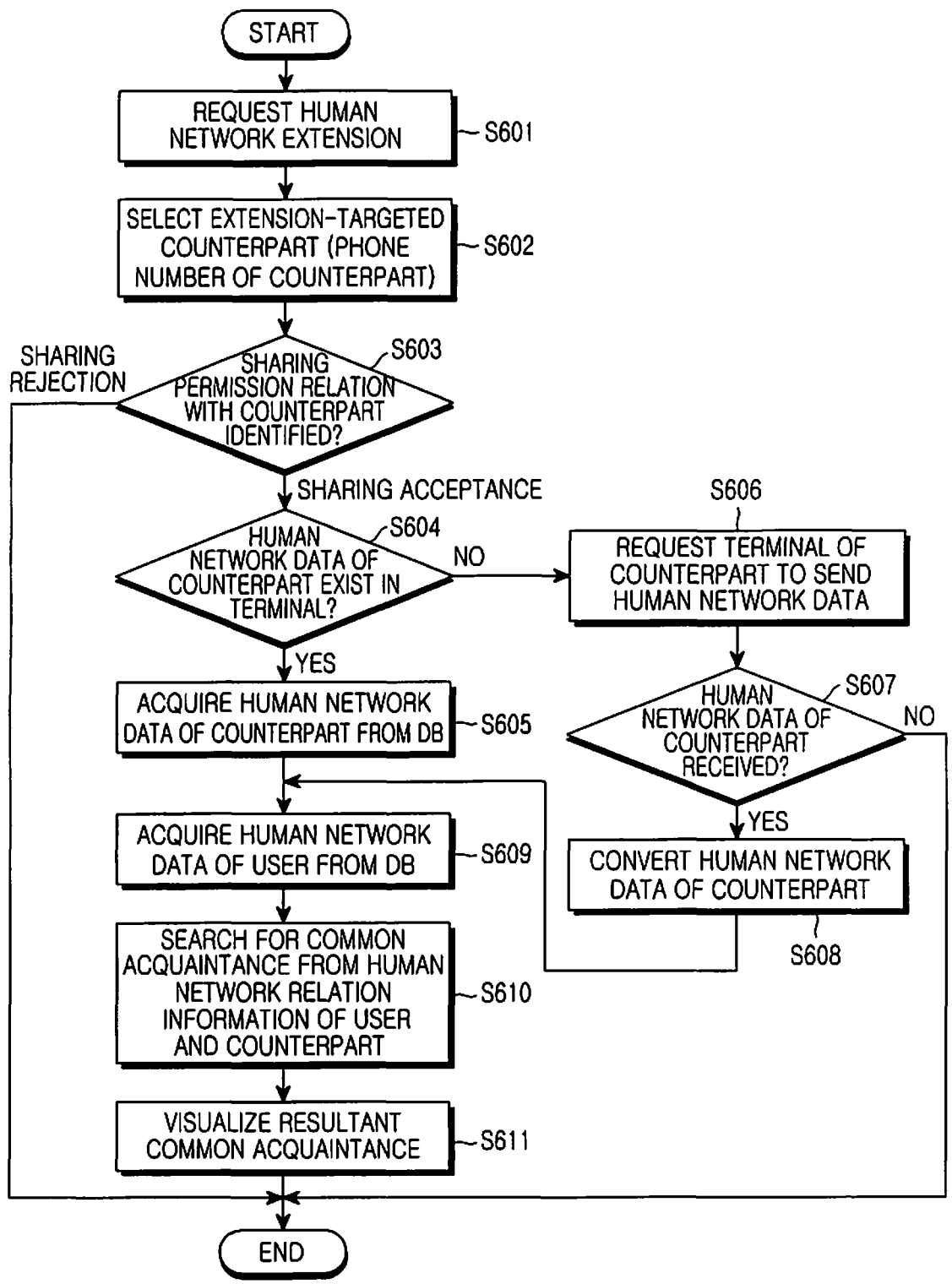
FIG. 6 is a flowchart illustrating a procedure for finding a common acquaintance through human network extension according to an embodiment of the present invention.

FIG. 6 is a flowchart illustrating a procedure for finding a common acquaintance through human network extension according to an embodiment of the present invention. Human network extension according to an embodiment of the present invention refers to finding a common acquaintance (i.e., a mutual acquaintance of both the user and another user), through sharing human network data with the other user.

Referring to FIG. 6, a user requests a human network extension in step S601, and selects a counterpart, to whom the human network extension request is to be sent, in step S602.

The user requests the human network extension, and may select a counterpart for the human network extension by inputting, for example, a telephone number, an e-mail address, a blog address, etc.

Thereafter, the mobile terminal of the user determines whether the human network data sharing with the counterpart is permitted, in step S603. If human network data sharing with the counter part is permitted, the mobile terminal determines whether human network data of the counterpart exists in the mobile terminal of the user, in step S604. If human network data corresponding to the counterpart exists, the mobile terminal acquires the human network data of the counterpart, in step S605.

When a mobile terminal of the counterpart has been set to share human network data, a determination of whether sharing with the counterpart is permitted is performed by the user's mobile terminal. When human network data extension between the user and the counterpart is permitted, a determination of whether human network data of the counterpart exists in the human network database 80 of the user's mobile terminal is performed. If the counterpart human network data exists in the human network database 80, the counterpart human network data is acquired.

When it is determined that the counterpart human network data does not exist in the user's mobile terminal in step S604, the user's mobile terminal requests the mobile terminal of the counterpart to send human network data in step S606, and then receives human network data of the counterpart in step S607.

Conversion of the human network data received from the mobile terminal of the counterpart may be required, as shown in step S608. However, conversion is not required when a schema defining human network data of the user is from the same as a schema defining human network data of the counterpart. In such a case, step S608 may be omitted.

Human network data of the user is acquired from a database in step S609, a common acquaintance is searched for based upon the human network data of the user and the human network data of the counterpart in step S610, and a result of the search is displayed to the user in step S611.

When a common acquaintance is searched for from the human network data of the user and the human network data of the counterpart, a search parameter, such as a name, a telephone number, an e-mail address, a homepage address, etc., is preferably used in order to distinguish different people from each other. A common acquaintance can be expressed in various manners. For example, a found common acquaintance may be expressed in one of forms shown in FIGS. 4C, 5A, and 5B, and the user, the counterpart, and the acquaintance may all be simultaneously expressed in one screen in order to express a relationship between the user, the counterpart, and the acquaintance.

Referring to FIG. 5B, according to an embodiment of the present invention, since a common acquaintance can be found through human network extension, it is possible to improve meetings with unfamiliar people (e.g., a blind date or meeting a person for the first time) by referring to the counterpart as a main subject of conversation. Also, even when finding a friend, the method according to the present invention can help identify a relationship correlation at a glance, for example a case where a third person who has been a user's friend in middle school is also a counterpart's friend in a church or university.

The present invention proposes a framework to manage a human network in a mobile terminal by allowing phonebook data in the mobile terminal to cooperate with individual data in a social network service constructed on the Internet. The present invention has advantages in that a social network on the Internet can be extended to a mobile terminal, individual data can be easily moved, and mobile terminals carried by people of all ages, regardless of time and place, can be utilized as tools for human network formation. According to embodiments of the present invention, a human network relationship can be checked through a mobile terminal, and various additional elements, such as a function of identifying a status and circumstance of a counterpart user, a function of sharing multimedia contents, and a function of finding a common acquaintance, are provided, so that it is possible to provide a user with a new user experience, and to provide the user with enjoyment and interesting information.

While the present invention has been shown and described with reference to certain embodiments thereof, it will be understood by those skilled in the art that various changes in form and details may be made therein without departing from the spirit and scope of the invention as defined by the appended claims.

What is claimed is:

1. A method for providing human network information in an electronic device, the method comprising:
   receiving, by the electronic device, information associated with user contacts from at least one external device associated with a network site;
   converting, by the electronic device, a first schema of the information associated with the user contacts into a specific schema;
   identifying, by the electronic device, relationship information related to a first user based on the information associated with the user contacts converted into the specific schema, the relationship information including data related to the first user and data related to a relationship between the first user and other users;
   grouping at least a portion of the relationship information into a plurality of categories; and
   displaying, on the electronic device, a human network relationship in two dimensions, wherein the plurality of categories are displayed to surround a central user item at different radial distances from the central user item in order of respective times since the plurality of categories occurred.

2. The method of claim 1, wherein the specific schema includes Friend Of A Friend (FOAF) information.

3. The method of claim 1, further comprising:
   transmitting a request for sharing to an electronic device of a second user;
   receiving relationship information related to the second user from the electronic device of the second user; and
   converting a second schema of the relationship information related to the second user into the specific schema.

4. The method of claim 3, further comprising:
   identifying a common acquaintance between the first user and the second user based on relationship information related to the first user and the relationship information related to the second user.

5. The method of claim 1, further comprising:
   displaying the plurality of categories, wherein each category includes at least a portion of relationship information related to the first user;
   receiving a selection of a category from among the displayed plurality of categories; and
   displaying relationship information associated with at least one user contact included in the selected category.

6. The method of claim 5, further comprising:
   displaying executable icons for contacting the at least one user contact included in the selected category, wherein the executable icons include at least one of a telephone call icon and a messaging icon.

7. The method of claim 5, further comprising:
   displaying information related to a specific user from among the at least one user contact included in the selected category in a separate window.

8. The method of claim 1, further comprising storing relationship information related to the first user based on the information associated with the user contacts converted into the specific schema.

9. The method of claim 1, further comprising:
identifying a degree of friendship classification for each of the other users included in relationship information related to the first user using histories of communication of the electronic device with the other users.

10. An electronic device for providing human network information, the electronic device comprising:
a processor configured to:
receive information associated with user contacts from at least one external device associated with a network site;
convert a first schema of the information associated with the user contacts into a specific schema;
identify relationship information related to a first user based on the information associated with the user contacts converted into the specific schema, the relationship information including data related to the first user and data related to a relationship between the first user and other users;
grouping at least a portion of the relationship information into a plurality of categories; and
display a human network relationship in two dimensions, wherein the plurality of categories are displayed to surround a central user item at different radial distances from the central user item in order of respective times since the plurality of categories occurred.

11. The electronic device of claim 10, wherein the specific schema includes Friend Of A Friend (FOAF) information.

12. The electronic device of claim 10, wherein the processor is further configured to:
transmit a request for sharing to an electronic device of a second user;
receive relationship information related to the second user from the electronic device of the second user; and
convert a second schema of the relationship information related to the second user into the specific schema.

13. The electronic device of claim 12, wherein the processor is further configured to:
identify a common acquaintance between the first user and the second user based on relationship information related to the first user and the relationship information related to the second user.

14. The electronic device of claim 10, further comprising:
a display,
wherein the processor is further configured to:
display, through the display, the plurality of categories, wherein each category includes at least a portion of relationship information related to the first user;
receive a selection of a category from among the displayed plurality of categories; and
display, through the display, relationship information associated with at least one user contact included in the selected category.

15. The electronic device of claim 14, wherein the processor is further configured to:
display, through the display, executable icons for contacting the at least one user contact included in the selected category, wherein the executable icons include at least one of a telephone call icon and a messaging icon.

16. The electronic device of claim 14, wherein the processor is further configured to:
display, through the display, information related to a specific user from among the at least one user contact included in the selected category in a separate window.

17. The electronic device of claim 10, wherein the processor is further configured to:
store relationship information related to the first user based on the information associated with the user contacts converted into the specific schema.

18. The electronic device of claim 10, wherein the processor is further configured to:
identify a degree of friendship classification for each of the other users included in relationship information related to the first user using histories of communication of the electronic device with the other users.

* * * * *